June 11, 1929.  J. A. BARRIER ET AL  1,716,754
CANE CUTTING MACHINE
Filed Aug. 3, 1925   2 Sheets-Sheet 2
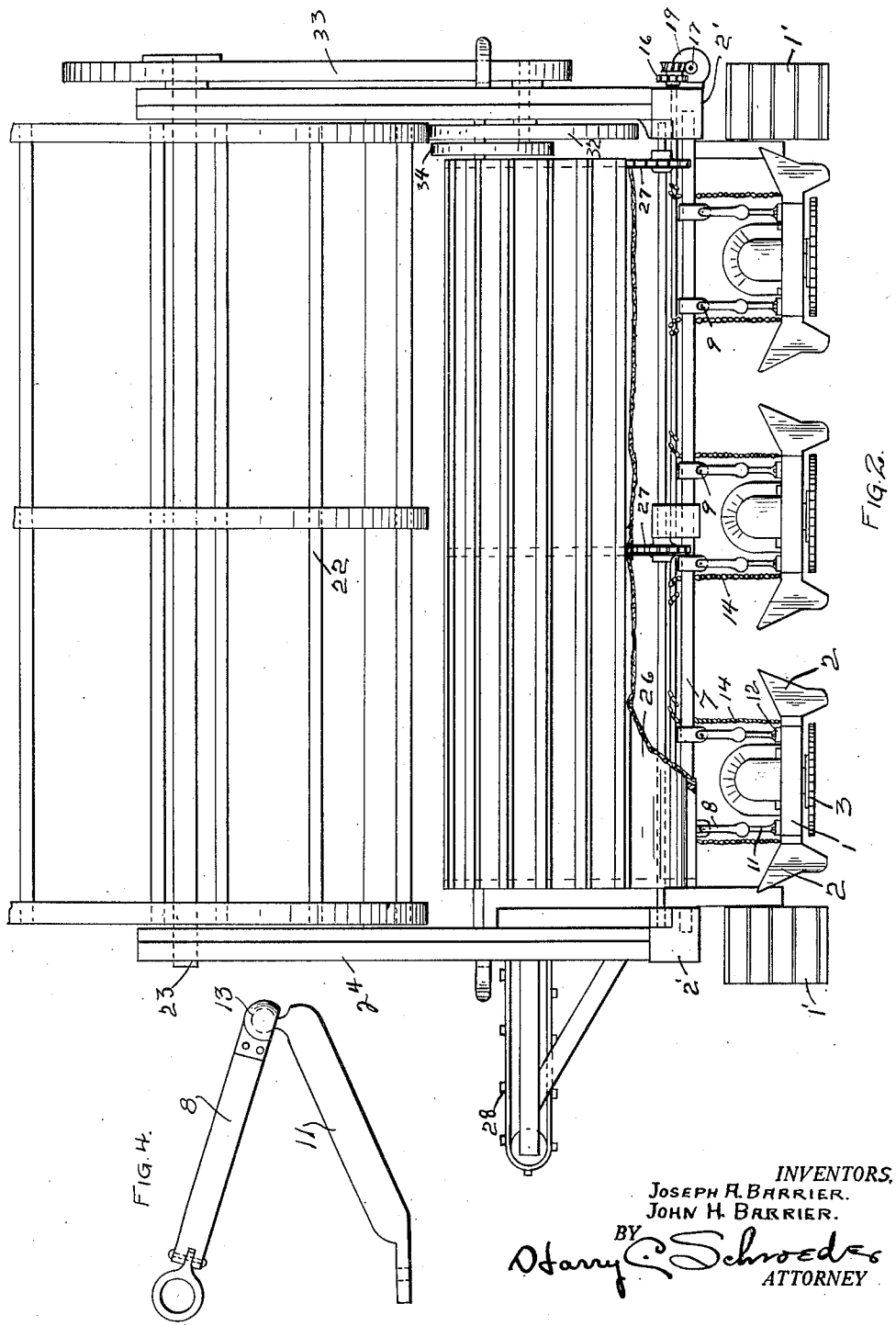
INVENTORS,
JOSEPH A. BARRIER.
JOHN H. BARRIER.
BY
ATTORNEY Patented June 11, 1929.

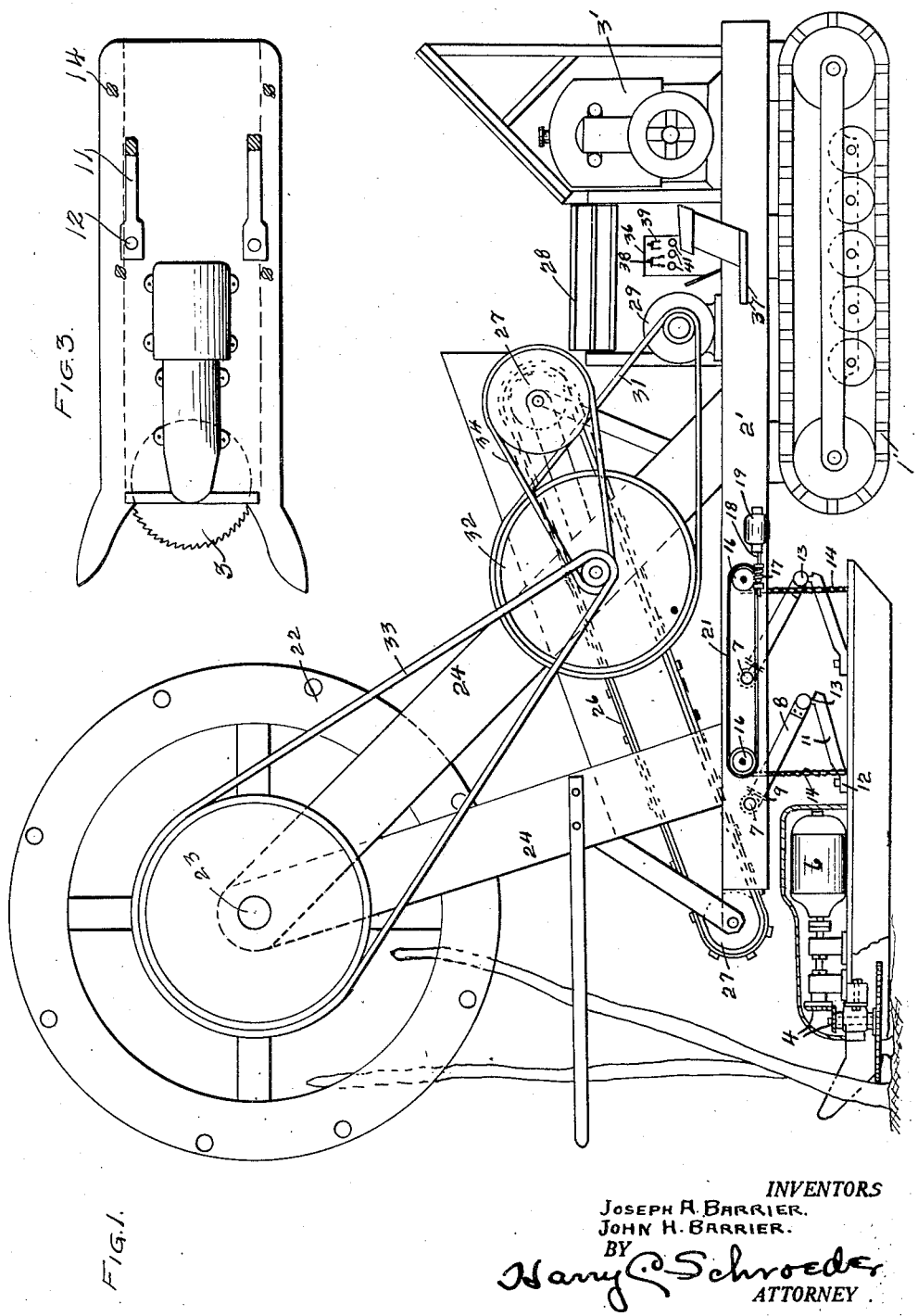

1,716,754

UNITED STATES PATENT OFFICE.

JOSEPH A. BARRIER AND JOHN H. BARRIER, OF OAKLAND, CALIFORNIA.

CANE-CUTTING MACHINE.

Application filed August 3, 1925. Serial No. 47,742.

The present invention relates to improvements in cane cutting machines and its particular object is to provide a convenient means for cutting sugar canes by machinery. It is particularly proposed in the present invention to use a portable cutter in combination with means for advancing the same over a row of sugar canes for cutting action, the portable cutter being mounted with freedom of side sway and having means associated therewith for guiding the same into operative relation with stalks or canes not lying in the row of stalks and outside of the normal path of the cutter.

It is further proposed to provide a complete unit allowing a plurality of our cutters to be arranged in operative relation to a tractor, preferably one of the endless tread type.

Further objects and advantages of our invention will appear as the specification proceeds.

The preferred form of our invention is illustrated in the accompanying drawing in which:

Figure 1 shows a side view of our cane cutting machine, certain parts being shown in section to disclose the interior.

Figure 2 is a front view of the same with certain portions cut away to disclose the working mechanism of certain parts.

Figure 3 is a top plan view of a sled used as a carrier for the cutter.

Figure 4 is a detail view of a side elevation of an elbow connection between the sled and the driving element for the same.

While we have shown only the preferred form of the invention, we wish to have it understood that various changes or modifications may be made within the scope of the claims hereto attached without departing from the spirit of the invention.

The tractor part of our device may be of any conventional type but preferably includes endless tread wheels 1', a frame 2' supported thereon and extending forwardly thereof and a power plant 3' mounted on the frame, preferably at the rear end thereof so as to counter-balance the weight of the mechanism supported on the front end of the frame 2' and incident to the function of the device as a sugar cane cutter.

Sugar canes are planted in parallel rows about three feet apart and at the harvest time form a heavy growth of canes most of which keep substantially within the space confined between two parallel lines, while usually a number of them stand slightly outside of the said two lines. It is a particular problem to find a cutter the action of which will normally be confined to the space between the two parallel lines previously referred to but will leave its normal path if necessary to include a cane standing away from the row into its operative field. As a practical means for solving this problem we propose to use sleds, the runners of which substantially straddle the roots of the sugar canes and are spaced to bring within its confines the general run of canes on a straight forward motion. The sleds, of which three are shown assembled into one unit, are provided at their front end with outwardly flaring wings 2 which, when the sled is advanced, will strike canes standing alongside of the row and will pull the sled over in the direction of the cane so as to subject the cane to the action of the disk cutter 3 mounted horizontally under the body of the sled in the front portion thereof and driven through the bevelled gears 4 by the motor 6 which latter is also mounted on the sled 1.

Rearwardly of the motor 6 two elbows connect the sled on each side with the front portion of the frame 2' and more particularly with transverse shafts 7 supported in the front portion of the frame 2'. Each elbow consists of an arm 8 extending downwardly and rearwardly from the shaft 7 and connected thereto for pivotal motion on the axis of the shaft 7 and also for pivotal motion on a pin 9 arranged transversely to said axis, a second link 11 extending rearwardly and upwardly from the sled and pivoted thereto as shown at 12 and a universal connection 13 between the two links 8 and 11. This arrangement allows the sled to be advanced by the frame 2' through the two elbows on either side of the sled and allows the sled to sway sideways in response to the action of a detached cane on one of the wings 2 so as to bring the latter cane into operative relation relative to the cutter 3. The elbow connection further allows of vertical motion of the sled relative to the frame 2' and such motion may be brought about by the unevenness of the ground surface and also by positive operation on the part of the driver through the chains 14 adapted to be wound on transverse shafts 16 one of which is operated by the worm 17 on the shaft 18 of a motor 19 while the other one receives rotary motion from the first one through the chain 21.

A reel 22 is revolvably supported on the shaft 23 having bearing in two standards 24 rising from the frame 2'. This reel revolves counter clockwise as viewed in Figure 1 and engages with the upper portions of the sugar canes facilitating the cutting operation and for pushing the canes after they have been cut on the conveyor 26 running over sprockets 27 and extending rearwardly from the front end of the sleds to deliver stalks to a second conveyor 28 delivering the stalks at the side of the machine. The reel 22 and the conveyor 26 are operated by a motor 29 connected by a belt 31 to a wheel 32 from which latter rotary motions is transferred to the shaft 23 by a belt 33 and to one of the conveyor shafts by a belt 34. A switch board 36 is preferably arranged in the vicinity of the driver's seat 37, a switch 38 being provided for the motor 19 a switch 39 for the motor 29 and three switches 41 for the 3 motors 6.

The operation of the machine will be readily understood from the foregoing description:

The three sleds are arranged to straddle three rows of sugar canes. As the machine advances over the field the disk cutter 3 cuts the canes and the latter are pushed by the reel 22 on the conveyor 26 from which they are transferred to the transverse conveyor 28. If any canes stand outside the normal row of canes they will be caught by the wings 2 which pull over the device toward the side of the stray cane so that the latter is subjected to the cutting action of the disk. If it is desired to move out of the field the entire sleds may be lifted out of contact with the ground surface by means of the chains 14 and the motor 19.

Having described our invention, we claim:—

1. In a cane cutting machine, a carrier made to straddle the roots of a row of canes, a cutting element supported in the carrier, means for advancing the carrier allowing the cutting element to become active upon the canes and guide means associated with the carrier adapted to guide the carrier out of its straight forward path to bring a detached cane disposed outside of a row within the confines thereof.

2. In a cane cutting machine, a sled made to straddle the roots of a row of canes, a horizontal cutting disk revolvably mounted between the runners thereof and means for advancing the sled allowing the disk to cut the canes disposed between the runners with guide means for the sled causing the latter to deviate from its normal path for bringing a detached cane disposed outside of a row within the confines of the runners.

3. In a cane cutting machine of the character described, a portable cutter, a pushing element, and an operative connection between the cutter and the pushing element for advancing the former permitting the cutter to sway sideways from its normal path, to bring a detached cane disposed outside of a row within the confines of said cutter.

4. In a cane cutting machine of the character described, a portable cutter, a pushing element surmounting the same and a link mechanism connecting the pushing element and the cutter for advancing the latter, the link mechanism being made to allow of sidesway of the cutter relative to the pushing element, whereby a detached cane disposed outside of a row may be brought within the confines of the cutter.

5. In a cane cutting machine of the character described, a portable cutter, a pushing element surmounting the same and a link mechanism connecting the pushing element and the cutter for advancing the latter, the link mechanism being made to allow of sidesway of the cutter relative to the pushing element and means being provided for lifting the cutter toward the pushing element.

6. In a cane cutter of the character described, a sled having runners, a revolving cutter mounted in the front thereof between its runners, a motor mounted on the sled, means for driving the cutter from the motor, a pushing element surmounting the rear end of the sled and means connecting the pusher and the sled comprising links pivoted to extend downwardly from the pushing elements, links pivoted to extend upwardly from the sled and elbow connections between the same.

7. In a device of the type described, a sled movable over the ground, cutting means carried by said sled, a frame movable over the ground, and flexible means connecting said sled to said frame for permitting lateral and vertical movement of said sled with respect to said frame.

8. A cane cutting machine comprising a frame movable over the ground, sled having runners for carrying the sled over the ground, cutters carried by said sled, flexible means for connecting said sled to said frame for moving said sled with said frame, yet permitting lateral and vertical movement of said sled with respect to said frame, conveyors for delivering the cut stalks to the side of the machine, and a reel for dropping the cut stalks upon one of said conveyors.

In testimony whereof we affix our signatures.

JOSEPH A. BARRIER.
JOHN H. BARRIER.